March 29, 1966  J. B. STRAND  3,243,701
APPARATUS FOR CAPACITIVE MEASUREMENT OF COATING THICKNESS
UTILIZING A SQUARE WAVE SOURCE AND GALVANOMETER
RESPONSIVE TO UNIDIRECTIONAL
DISCHARGE CURRENT
Filed Jan. 3, 1962
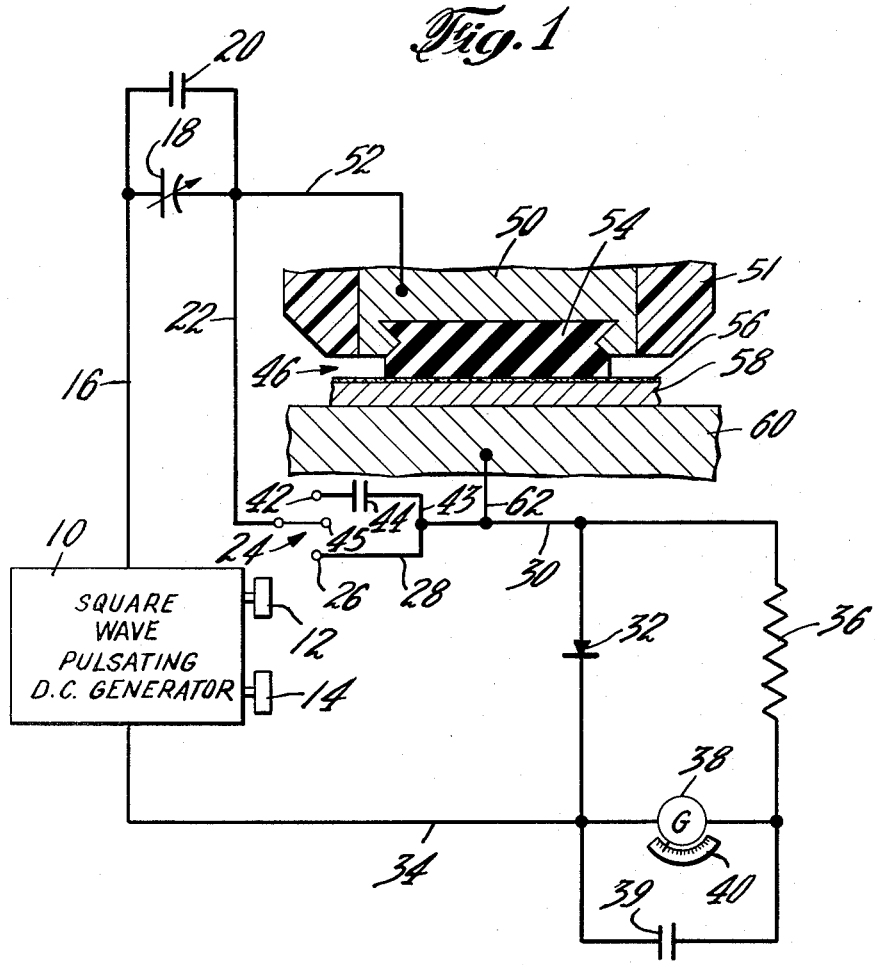
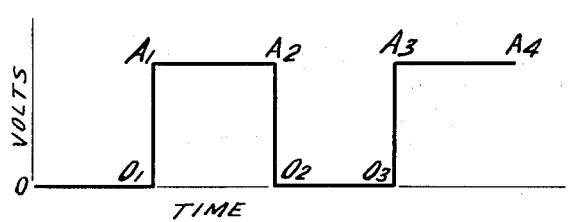
INVENTOR.
JOHN B. STRAND
BY Robert P Auber
George W Reiber
ATTORNEYS

United States Patent Office 3,243,701
Patented Mar. 29, 1966

3,243,701
APPARATUS FOR CAPACITIVE MEASUREMENT OF COATING THICKNESS UTILIZING A SQUARE WAVE SOURCE AND GALVANOMETER RESPONSIVE TO UNIDIRECTIONAL DISCHARGE CURRENT
John B. Strand, Oakland, Calif., assignor to American Can Company, New York, N.Y., a corporation of New Jersey
Filed Jan. 3, 1962, Ser. No. 164,131
2 Claims. (Cl. 324—61)

This invention relates to a capacitance measuring device for use in determining the thickness of electrically non-conductive coatings on metallic materials. The invention is particularly useful in measuring organic coatings on flat sheet or articles.

Generally where extremely thin organic coating thicknesses are to be measured, a sample of the coated material is weighed; the coating is then removed by an appropriate means; the sample is weighed again; and a calculation is then made to determine the coating thickness. This calculation must take into account the surface area coated, the weight of the coating, and physical properties of the coating material.

Disadvantages of this gravimetric method of coating determination are many. Destruction of the sample is, of course, necessary. This is not only wasteful, but can be expensive where a costly item is involved. It is also time consuming since a number of manual operations are involved. Due to the fact that the coating weight is a relatively small percentage of the entire sample weight, slight errors in any of the measurements will result in a highly erroneous coating thickness determination.

Use of the present invention will not only give highly accurate measurements of coating thickness over a very small surface area but will also reduce measurement time and loss of material since this capacitance measuring method is non-destructive.

In addition, the simplicity of this invention allows the device to be compact and easily portable. Thus it can be moved when necessary, rather than requiring routing of the test samples to a central location for coating thickness measurement.

Non-destructive means for measuring the thickness of thin non-conductive coatings on metals have received considerable attention in recent years due to the need for high speed quality control methods in production. The techniques heretofore employed have required very delicate instruments that were difficult to maintain and calibrate. This was partly due to the complicated components necessary, in their electrical circuitry and also difficulty in maintaining proper contact between the measuring device and the coating. The latter problem has been solved by a probe which is fully described in co-pending application Serial No. 28,886 filed by Harris Jay Wolbert on May 13, 1960, now abandoned and entitled Apparatus for Measuring Coating Thickness, while the former has been overcome by the present invention.

Since the above method for measuring coating thickness is essentially a method for measuring capacitance, wherein the electrically non-conductive coating serves as the dielectric and the metal substrate and the conductive probe act as two plates of a parallel plate capacitor, considerable care had to be observed in measuring such small capacitances as are obtained in such coated items as tin-plated steel containers. In such a case the thickness of dry organic coating will vary from 0.02 to 1.00 mil with a usual thickness of about 0.1 mil. Using a probe of 0.1 square inch surface area, the measured capacitance of the average coating thicknesses used would be from about 10 to 1000 mmf.

When computing the thickness of a coating using the capacitance measuring method the following formula is used:

$$d = KA/4\pi C$$

A is the area of the conducting plates of the capacitor, C is the capacitance, and d is the distance between the conductors. In the present invention the conductors are the resilient probe and the coated metal, while d is the thickness of the dielectric, or coating, being measured. K is the dielectric constant of the coating forming the dielectric.

There are two common methods for measuring capacitance, the ballistic method and the bridge method. The bridge method utilizes a modified Wheatstone bridge and an alternating current power supply. In this method, calibration of the circuit is very critical and sensitive to environmental conditions.

In the ballistic method of measuring capacitance, a direct current charges the capacitor to be measured. Either during the charging or discharging of the capacitor the current flows through a galvanometer, causing the galvanometer to momentarily deflect and indicate capacitance. It is well known that with this method (see Electrical Engineering vol. I, Dawes, McGraw-Hill, 1937, p. 347) several readings have to be taken on the galvanometer because it does not maintain its deflection.

It is, therefore, an object of the present invention to provide a novel electrical circuit for measuring the thickness of an electrically non-conductive dry coating by means of capacitance.

Another object is to provide a capacitance measuring circuit which uses a galvanometer and which is energized in such manner that the galvanometer will hold a steady reading for any desired period of time.

A further object is to provide a capacitance measuring device which is relatively simple and rugged in construction.

A still further object is to provide a capacitance measuring device which can be lightweight and portable.

An additional object is to provide a capacitance measuring circuit which will maintain calibration for extended periods of time.

Numerous other objects and advantages of the invention will be apparent as it is better understood from the following description, which, taken in connection with the accompanying drawing, discloses a preferred embodiment thereof.

Referring to the drawing:
FIGURE 1 is a schematic view of a capacitance measuring circuit, including a capacitor; and
FIGURE 2 is a diagram illustrating the output voltage of a pulse-supply generator used in the circuit.

As mentioned previously, the basic direct current ballistics circuit for measuring capacitance produces but a momentary deflection of the galvanometer in series with the capacitor to be measured. It is substantially impossible for the human eye to read such a brief deflection.

To overcome this, the circuit of the instant invention uses a pulsating direct current generator whereby the direct current supplied to the capacitor in the circuit is pulsed in rapid sequence. The output of this generator will be referred to hereinafter as a square wave; although it is to be understood that a plot of voltage against time may have any rectangular configuration. Preferably the on time of the generator will be shorter than its off time thereby making the portions of the voltage-time plot rising from the abscissa longer than they are wide. The voltage pulsation from the generator causes the current to flow first in one direction through the circuit during each positive pulse from the generator, and in the opposite direction through the circuit as a result of capacitor discharge between each positive generator pulse. By having the generator supply sufficiently rapid pulses, the inherent inertia of a galvanometer will prevent its pointer from swinging in immediate response to the current flowing alternately in opposite directions so that it will read an average of the two. This average reading, however, is of no use since it would be the average between deflection in the positive direction and deflection in the negative direction.

This latter problem is overcome in the circuit of the instant invention by providing this circuit with a uni-directional current conducting device such as a diode in parallel with the galvanometer. This diode has a lower resistance to the passage of current in one direction than has the galvanometer and/or an auxiliary resistance in serives with the galvanometer. By this means, the current flowing through the circuit in one direction flows through the diode and shunts the galvanometer; but when flowing in the opposite direction, shunts the diode and passes through the galvanometer. Thus, by means of the combination of the square wave, pulsating D.C. generator and the uni-directional current conductive device in parallel in the circuit with the galvanometer, pulses of electric energy pass through the galvanometer in one direction only in rapid sequence thereby causing a substantially steady deflection of the galvanometer which is related to the unknown capacitance in the circuit. By this means the galvanometer may be easily read visually; and by means of suitable calibration can be used to indicate thickness of the dielectric in the unknown capacitance.

As a preferred or exemplary embodiment of the instant invention, FIGURE 1 shows a square wave, pulsating, D.C. generator 10. The generator 10 may be of any suitable type known to the art for developing a pulsating D.C. voltage which, when measured against time, has the rectangular wave shown in FIGURE 2. Connected to the generator 10 is a voltage magnitude adjuster 12 which can be manipulated to provide the desired preselected magnitude of voltage such as shown in FIGURE 2. Also connected to the generator 10 is a duration adjustment 14 to regulate to the desired level the duration or frequency of the pulse.

Before the instrument can be used for the measurement of the thickness of the dielectric in the unknown capacitance, it must be calibrated. To accomplish this, the generator 10 passes current through lead 16, through variable capacitor 18 and fixed capacitor 20 in parallel therewith, charging these capacitors, through lead 22 to a manually operable single pole, triple throw switch generally designated 24. The fixed capacitor 20 provides for the range in which the instrument is to operate and has a larger capacitance than the variable capacitor 18 in parallel therewith thereby permitting very fine adjustments in the capacitor 18 and thus in the entire circuit. These fine adjustments are important both as to calibration of the circuit and accuracy of the readings.

The switch 24, having been closed on the contact 26, permits current to flow through the leads 28 and 30 and through the uni-directional current conductive device 32 which, in the embodiment illustrated, is a diode and thence through lead 34 back to the generator 10. It will be noted that the circuit just described shunts the unknown capacitor shown in FIGURE 1 omitting it from the circuit.

Also, as seen in FIGURE 1, the resistance 36 and galvanometer 38 in series with one another are mounted in parallel with the diode 32. The resistance 36 represents the internal resistance of the galvanometer 38 and, if necessary, an additional resistance in this leg of the circuit to provide an overall resistance in this leg greater than the resistance of the diode 32 to the flow of current in the direction described immediately above. This insures that during the ON or positive pulse period of square wave generator 10, the current will flow through the diode 32 and little or no current will flow through the galvanometer 38.

By means of the previous setting by the duration adjustment 14 each successive positive pulse from the generator terminates whereupon, due to the charge on the capacitors 18 and 20, the current then flows in the circuit defined above in the opposite direction. The resistance of the flow of current in this direction in the diode 32 is greater than the resistance to flow through the galvanometer 38 and resistance 36 whereby this reverse current flows solely through the galvanometer 38. The rapidity of repetition of this cycle causes a steady deflection in the galvanometer which is a measure of the capacitance of the capacitors 18 and 20. A capacitor 39 is placed in parallel with the galvanometer 38 as a stabilizer for the galvanometer. The voltage adjustment 12 and/or frequency adjustment 14 are then manipulated so that the deflection of the galvanometer 38 points to the zero mark on its associated scale 40. Adjustments 12 and/or 14 are also used to regulate the sensitivity of the instrument.

The instrument is then adjusted to insure that the indicator on the galvanometer will read in the most accurate portion of the scale 40, i.e., the center two-thirds of the scale. The switch 24 is closed on the contact 42 whereby the current passes from the generator 10 through the capacitors 18 and 20, through lead 22, through a fixed capacitor 44, through leads 43, 30, diode 32 and lead 34 back to the generator 10 in a manner similar to that described above. When the pulse ceases the current flows in the opposite direction, again through galvanometer 38 to give a certain deflection thereto.

A value of the fixed capacitor 44 is selected to give a predetermined reading in the most accurate portion of the scale 40. If, when capacitor 44 is in the circuit, the galvanometer does not give this predetermined reading, the variable capacitor 18 is adjusted to obtain this predetermined reading. Once adjusted, further adjustment of the variable capacitor 18 is only necessary at infrequent periods such as if climatic conditions vary greatly. To determine if readjustment is needed, it is necessary only to throw capacitor 44 into the circuit to see if the galvanometer gives the predetermined reading. The device is now ready for the measurement of the thickness of a dielectric in the unknown capacitor.

Switch 24 is closed on the open contact 45 to remove the calibration leg, including lead 22, switch 24, leads 28 and 43 and capacitor 44, from the circuit. The unknown capacitor, generally designated 46, is inserted into the circuit.

A conductive head 50, connected to the capacitors 18 and 20 by a lead 52, supplies current to the capacitors 46. A sleeve 51 surrounds and electrically insulates the sides of the head 50. Fixedly mounted in the head 50 is a resilient current conducting member or probe 54 which bears upon a non-conductive coating 56 applied to a conducting substrate 58 which in turn is supported on a conductive supporting member 60. As described in the aforementioned Wolbert application, the current conductive resilient material of the probe 54 insures predetermined surface area contact with the coating 56 which forms the dielectric of the unknown capacitor 46.

During measurement, the pulsating voltage from the generator 10 causes current to flow in one direction in the circuit identified by the lead 16, capacitors 18 and 20, lead 52, head 50, probe 54, coating 56, substrate 58, support 60, lead 62, diode 32 and lead 34 back to the generator 10 whereby the unknown capacitor 46 becomes charged. This portion of the cycle is represented by the lines $O_1A_1A_2$ in FIGURE 2. As mentioned previously, during this portion of the cycle little or no current flows through the galvanometer 38.

At time $A_2$ (FIGURE 2) the magnitude of the pulsating voltage drops to zero (lines $A_2O_2$) or to a voltage such that the magnitude of the voltage across the leads 16 and 34 is less than the magnitude of the voltage across the capacitor 46. As a result the capacitor 46 starts to discharge and causes the flow of current in a reverse direction through a circuit identified by the probe 54, the head 50, the lead 52, capacitors 18 and 20, leads 16, generator 10, lead 34, galvanometer 38, resistance 36 and leads 30 and 62. This flow of current through the capacitor 46 in a reverse direction continues for time $A_2O_2O_3$ (FIGURE 2) or during that time when the magnitude of the output voltage supplied by the generator 10 is less than the magnitude of the voltage across the capacitor 46. It will also be noted that during the discharge of the capacitor 46 the current flowing in the leads 62 and 34 flows through the galvanometer 38 causing it to deflect and indicate the reading on the scale 40. This deflection indicates the capacitance of the capacitor 46; and when the scale 40 is so calibrated, it indicates the weight or thickness of the coating 56.

The theory of calibrating the scale 40 is as follows: Capacitors 18 and 20 being in series with capacitor 46, the total circuit capacitance is $$C_t = \frac{(C_{18}+C_{20}) \times (C_{46})}{(C_{18}+C_{20})+C_{46}}$$

according to the formula for computing total capacitance for series and parallel wiring. Where capacitors 18 and 20 are maintained constant and 46 is changed by varying the thickness of the dielectric, the resulting curve will be a hyperbola. The scale 40 on galvanometer 38 may be developed to indicate this hyperbolic curve and thus by appropriate scale markings, the weight or thickness of the coating 56 directly.

Between $O_2$ and $O_3$ the circuit potential is zero. When $O_3$ is reached in FIGURE 2 the next succeeding voltage pulse having a voltage magnitude greater than the voltage across the capacitor 46 causes current to flow again in the capacitor 40 in a charging direction and through the diode 32 (time $O_3A_3A_4$). Continued repetitive charging and discharging of the capacitor 46 thus repetitively sends pulses of current through the galvanometer 38 during the discharge time and sends current through the shunt diode 32 to bypass the galvanometer during the charging of the capacitor 46.

The direction of the diode 32 determines whether the galvanometer 38 will be subjected to either the capacitor charging or discharging currents. Although the instant specific embodiment subjects the galvanometer 38 to discharge currents, it is understood that the galvanometer can be subjected to only charging currents, if desired, by reversing the direction of the diode or rectifier 32.

Coatings having different physical properties, e.g. density, have different dielectric constants even when their thicknesses are the same. To enable the subject instrument to be used with a number of types of coatings, it is provided with an equal number of pairs of capacitors 18 and 20. When it is desired to change from measuring one type of coating to another it is necessary merely to switch into the circuit the appropriate pair of capacitors 18 and 20, preselected to match that particular type of coating; and re-establish the zero reading of the galvanometer 38 on scale 40 by manipulating the frequency control 14. Thereafter, the thicknesses or weight of the new type of coating is determined as previously described. Such a change is extremely simple requiring less than a minute to accomplish; and provides the instrument with great versatility.

It is to be understood that the same result could be accomplished by keeping the original capacitors 18 and 20 in the circuit and switching in different capacitors 44, each matched with a particular type of coating. With this arrangement it is necessary to reestablish a predetermined reading for the new capacitor 44 on the scale 40 by manipulating the variable capacitor 18 as previously described. Thereafter thickness or weight determination of the new type of coating proceeds as already described.

It is thought that the invention and may of its attendant advantages will be understood from the foregoing description and it will be apparent that various changes may be made in the form, construction and arrangement of the parts without departing from the spirit and scope of the invention or sacrificing all of its material advantages, the form hereinbefore described merely being a preferred embodiment thereof.

I claim:

1. A ballistic galvanometer circuit for measuring capacitance to determine the thickness of insulating coatings comprising a square wave pulsating D.C. generator, a range capacitor circuit and a galvanometer connected in series with an unknown capacitor formed from an electrode pair on either side of said insulating coating, said range capacitor circuit enabling said galvanometer to operate within a predetermined range and including at least one variable capacitor connected in parallel with at least one fixed capacitor, a diode connected in parallel with said galvanometer, and being circuit oriented that during the ON state of the generator the current of the generator will flow through the diode and substantially no current will flow through the galvanometer, said galvanometer having a serially connected input resistance sufficient to cause non-flow of substantially the entire current applied in the forward direction of said diode, one of said electrodes having a probe of resilient conducting material fixedly mounted in a movable head to bear upon said insulating coatings to be measured, said galvanometer providing substantially exclusively the sole path for current flow in the other direction through said circuit in response to successive charging and discharging of the unknown capacitor, the current of said sole path thereby indicating a value on said galvanometer in accordance with the value of said unknown capacitor.

2. The device as claimed in claim 1 further comprising switch means, calibrating capacitor means, said switch means connected in series to form a series arrangement with said calibrating capacitor means, said series arrangement being connected in shunt with the unknown capacitor to be measured, said galvanometer being calibrated when said switch means is closed and said calibrating capacitor is removed from circuit with the galvanometer when said switch means is open.

References Cited by the Examiner
UNITED STATES PATENTS

| | | | |
|---|---|---|---|
| 2,455,543 | 12/1948 | Williams | 324—60 |
| 2,766,428 | 10/1956 | Sippach | 324—61 |
| 3,159,786 | 12/1964 | Bayne | 324—60 |

WALTER L. CARLSON, *Primary Examiner.*

J. P. O'BRIEN, W. H. BUCKLER, *Assistant Examiners.*